United States Patent

Schewerda

(10) Patent No.: US 8,297,898 B2
(45) Date of Patent: Oct. 30, 2012

(54) FASTENING DEVICE

(75) Inventor: Steffen Schewerda, Aschaffenburg (DE)

(73) Assignee: SAF-Holland GmbH, Bessenbach (DE)

( * ) Notice: Subject to any disclaimer, the term of this patent is extended or adjusted under 35 U.S.C. 154(b) by 191 days.

(21) Appl. No.: 12/374,849

(22) PCT Filed: Feb. 28, 2008

(86) PCT No.: PCT/EP2008/001588
§ 371 (c)(1),
(2), (4) Date: Jun. 3, 2009

(87) PCT Pub. No.: WO2008/104395
PCT Pub. Date: Sep. 4, 2008

(65) Prior Publication Data
US 2009/0317206 A1    Dec. 24, 2009

(30) Foreign Application Priority Data

Mar. 1, 2007   (DE) .......................... 10 2007 010 020

(51) Int. Cl.
*F16B 39/04*   (2006.01)
(52) U.S. Cl. ...................................... 411/316; 411/198
(58) Field of Classification Search .................. 411/316, 411/317, 321, 322, 925, 946, 198, 948
See application file for complete search history.

(56) References Cited

U.S. PATENT DOCUMENTS

| 509,009 | A | * | 11/1893 | Wecker | 411/322 |
|---|---|---|---|---|---|
| 536,934 | A | * | 4/1895 | McConley | 411/198 |
| 827,941 | A | * | 8/1906 | Potter | 411/316 |
| 975,605 | A | * | 11/1910 | Cooper | 411/211 |
| 1,086,944 | A | * | 2/1914 | Shivers | 411/316 |
| 1,184,872 | A | * | 5/1916 | Radovich | 411/316 |
| 1,301,958 | A | * | 4/1919 | Mendenhall | 411/427 |
| 1,328,939 | A |  | 1/1920 | Andrew |  |
| 1,379,394 | A | * | 5/1921 | Cocks | 411/198 |
| 1,447,811 | A | * | 3/1923 | Olmstead | 411/214 |
| 1,582,094 | A | * | 4/1926 | Sweet | 411/193 |
| 1,740,094 | A | * | 12/1929 | Huff | 411/353 |
| 2,308,605 | A | * | 1/1943 | Hillstrom | 411/210 |
| 2,794,474 | A | * | 6/1957 | Stukenborg | 411/217 |
| 3,208,493 | A | * | 9/1965 | Holmes | 411/322 |
| 3,464,474 | A | * | 9/1969 | Jansen | 411/216 |
| 5,779,414 | A | * | 7/1998 | Adkins et al. | 411/317 |

FOREIGN PATENT DOCUMENTS

| DE | 3410873 | 10/1985 |
|---|---|---|
| DE | 3525947 | 1/1987 |

\* cited by examiner

*Primary Examiner* — Gary Estremsky
(74) *Attorney, Agent, or Firm* — Price Heneveld LLP

(57) ABSTRACT

A fastening device for a nut comprises a fastening part configured to engage in a screw element, a securing part configured to engage in the nut, and an intermediate part providing a non-positive connection between the fastening part and the securing part, wherein the intermediate part is made of a restorable material and is designed to apply a restoring torque directed at the original state during a rotation of the securing part in relation to the fastening part.

12 Claims, 2 Drawing Sheets

FASTENING DEVICE

BACKGROUND OF THE INVENTION

1. Field of the Invention

The present invention relates to a fastening device for a vehicle axle nut.

2. Technical Background

Fastening devices for a nut are rather well known from the prior art. For example, US 733,532 discloses an axle nut securement which is fashioned as a single piece with an axle nut being secured. The axle nut securement has an elastic fork, which is designed to engage with corresponding recesses on the inside of the axle. However, the problem with such fastening devices is that a so-called "residual torque" is exerted on the nut in rotating screw elements or axles, which can lead to a loosening of the nut.

Thus, the problem of the present invention is to provide a fastening device for a nut, especially an axle nut, as well as a screw connection, especially for vehicle axles, which ensure a secure fastening of the nut on the corresponding screw element.

SUMMARY OF THE INVENTION

According to the invention, a fastening device is provided for a nut, especially an axle nut, comprising a fastening part, which is designed to engage with a screw element, a securing part, which is designed to engage with the nut, and an intermediate part, which constitutes a non-positive connection between the fastening part and the securing part, wherein the intermediate part is made of a restorable material and is designed to apply a restoring torque directed at the original state upon rotation of the securing part relative to the fastening part. The fastening device serves, in particular, to fasten a vehicle axle nut, so that the fastening device can likewise be configured as a vehicle axle nut fastening device. The fastening part is advantageously designed to engage with a screw element. The screw element can be configured in any desired shape and thus includes all geometrical configurations having, in particular, an outer threading, e.g., a screw, a bolt, or an axle. Due to the engagement between fastening part and screw element, a positive and/or non-positive connection is advantageously ensured between fastening part and screw element. The screw element, in particular, serves to receive the nut, i.e., the nut is to be fastened or screwed on the screw element. The securing part is designed to engage with the nut. The engagement can be configured, in particular, so that a positive and/or non-positive connection is provided between the securing part of the fastening device and the nut. Furthermore, an intermediate part is provided, which advantageously produces a non-positive connection between the fastening part and the securing part. The intermediate part can be designed in particular as an intermediate element arranged between fastening part and securing part. Of course, the intermediate part can moreover constitute a positive connection between the fastening part and the securing part, especially for an integral or one-piece or one-part configuration of the fastening device. The intermediate part is advantageously made from a restorable material. In other words, the intermediate part is configured so that, when deformed, it has a tendency to return to the original state once again. In particular, the intermediate part can be made of an elastically deformable material. However, the restoring capability can also be provided additionally or alternatively by the geometrical configuration, for example, in the form of a helical screw loaded by torsion. Moreover, the intermediate part is advantageously designed to exert a restoring moment directed at the original state of the fastening device when the securing part is rotated or twisted relative to the fastening part. The twisting or torsion of the securing part relative to the fastening part will occur in particular about the lengthwise axis of the screw element, which corresponds to the direction of advancement when the nut is screwed in and out. The original state of the fastening device is the state adopted by the fastening device when no external forces are acting on it. Due to the restorable properties of the intermediate part, a corresponding restoring moment produced by the intermediate part is thus exerted on the fastening part and the securing part. In this way, it is possible to exert on the nut a moment acting in the direction of screwing in, so as to ensure that the nut does not become loosened from the screw element, but instead has a tendency to be screwed further onto the screw element.

The intermediate part is configured as a twistable, sheetlike element. The intermediate part can be configured as an essentially sheetlike element. Thus, for example, the intermediate part can be configured as a basically rectangular sheetlike element, which is twisted or distorted about its lengthwise axis so that its free ends are twisted opposite each other. Consequently, the intermediate part can be designed as a torsion element or a torsion spring. Of course, not only sheetlike configurations, but also any other configurations may be possible. Thus, the intermediate part can be cylindrical in configuration, for example, and the free ends of the cylinder can be twisted oppositely.

The fastening part has at least one fastening segment which is designed to engage with the inner wall of a recess of the screw element. The engagement here can be, in particular, positive and/or non-positive. The recess of the screw element is preferably configured so that it extends from one end face of the screw element into the screw element in a direction essentially parallel to the lengthwise axis of the screw. The inner wall of the screw element therefore defines the recess. The fastening segment of the fastening part can engage, in particular, with the circumferential inner wall of the recess. In addition or alternatively to this, however, the fastening segment can also engage with the end wall of the recess. The fastening segment of the fastening part can have any desired configuration, in particular, it can be shaped so that a positive and/or non-positive engagement with the recess is ensured.

The fastening part has a plurality, preferably two or a multiple thereof, of fastening segments, which are preferably arranged opposite each other. The fastening segments are configured basically in accordance with the above remarks. In particular, the fastening segments are arranged relative to each other so that they are arranged basically opposite to each other in relation to the lengthwise axis of the screw element.

The fastening segment is configured so that it engages in an essentially groovelike recess of the screw element. Therefore, the fastening segment is shaped to be essentially congruent to a groove, thereby achieving essentially a positive locking with the groovelike recess of the screw element.

The fastening segment has at least one locking projection, for example, a claw-shaped barb. The locking projection is configured so that its free end is basically pointing toward the securing part. The locking projection is preferably designed to engage with a corresponding surface configuration of the screw element. The engaging can be such that a removal of the fastening device from the screw element results in a destruction of the locking projection.

The securing part has at least one securing segment, which is designed to engage with the outer wall, especially the flanks of the nut. The securing segment of the securing part is thus configured, in particular, to provide a positive and/or non-positive locking between the outer wall of the nut and the securing part. In particular, the securing segment is designed so that it can engage with the lateral flanks of the nut, preferably by a positive locking. In this way, it is ensured that a rotation of the nut likewise leads to a rotary movement of the securing segment of the securing part.

The securing part has a plurality, preferably two or a multiple thereof, of securing segments, which are preferably arranged opposite to each other. The securing segments are arranged essentially opposite to each other in relation to the lengthwise axis of the screw element. Due to providing two securing segments or a multiple thereof, an especially secure positive locking is ensured between the securing part and the nut.

The securing segment is fashioned as an essentially U-shaped shackle, whose side walls forming the legs of the U-shape engages with the nut. The securing segment can thus be fashioned as a sheetlike element, whose free ends can be bent up to form a U. The side walls of this securing segment can thus be made to engage preferably with two basically oppositely positioned flanks of the nut, so that a positive locking can be provided between the securing segment and the nut. Of course, the securing segment can likewise have any desired shape by means of which a positive and/or non-positive locking is made possible between nut and securing segment. Thus, for example, the securing segment can be fashioned as a cap or a cage, which at least in part covers or encloses the nut.

Preferably, at least the intermediate part is made from a metal, preferably spring steel. This ensures an especially advantageous restoring property of the intermediate part. At least one of the fastening part and the securing part are made from a plastic. Thus, the fastening device can be fashioned, for example, so that the intermediate part is made from spring steel and the fastening part and the securing part are made from a plastic, which is preferably essentially heat resistant. Alternatively, however, the entire fastening device can be fashioned from a metal.

The fastening device may be fashioned as a single part or piece. Thus, for example, the fastening device can be fashioned as a single cast or molded part, e.g., an injection molded part made from plastic.

In another embodiment, the fastening device is made at least partly from a temperature-indicating material. This material can be configured such that it undergoes an irreversible color change when subjected to heat. In this way, it is possible to ascertain the heat which has been applied to the screw element and/or the nut during a maintenance procedure.

The present invention further provides a screw connection, especially for vehicle axles, comprising a screw element, a nut, especially an axle nut, and a fastening device for the nut, which has a fastening part, which engages or can be made to engage with the screw element, a securing part, which engages or can be made to engage with the nut, and an intermediate part, which produces a non-positive connection between the fastening part and the securing part, wherein the intermediate part is made of a restorable material and is designed to apply a restoring torque directed at the original state upon rotation of the securing part relative to the fastening part. Preferably, the screw element has a recess extending essentially in the axial direction, on whose inner wall an essentially axially extending groove is preferably formed. The recess extends essentially in the axial direction or the lengthwise direction of the screw element, and the recess can have any desired geometrical cross section configuration. Thus, for example, the recess can have a circular, oval, or polygonal cross section configuration, the round cross section configuration being preferred for fabrication reasons. On the inner wall of the recess, at least one groove is fashioned, extending essentially axially, while advantageously two or a multiple of two grooves can be provided. In particular, these can be arranged essentially opposite each other in relation to the lengthwise axis of the screw element.

Further benefits and features of the present invention will emerge from the following sample description of preferred embodiments of the invention with reference to the enclosed figures.

DETAILED DESCRIPTION OF THE PREFERRED EMBODIMENTS

Figure 1:
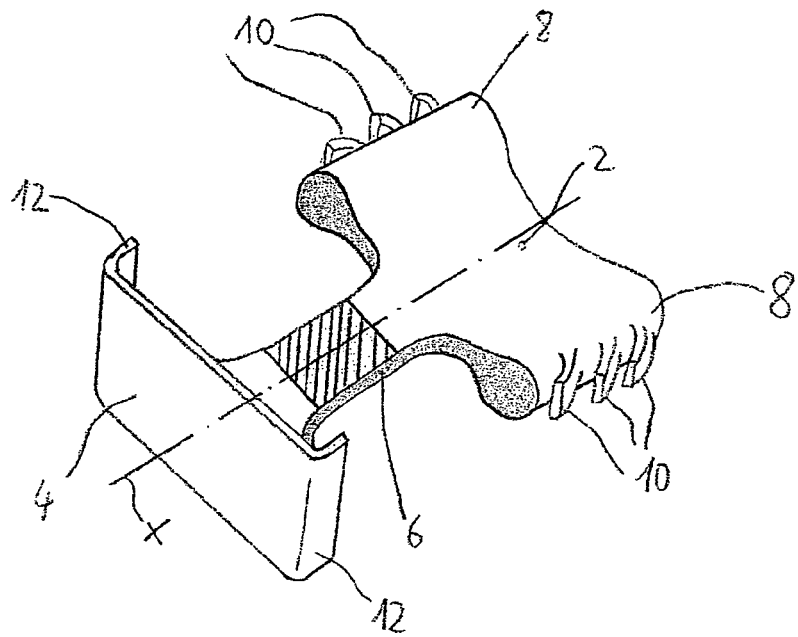
FIG. 1 is a perspective view of a fastening device of the invention.

FIG. 1 shows a perspective view of a fastening device of the invention. The fastening device comprises a fastening part 2, a securing part 4 and an intermediate part 6.

Figure 3:
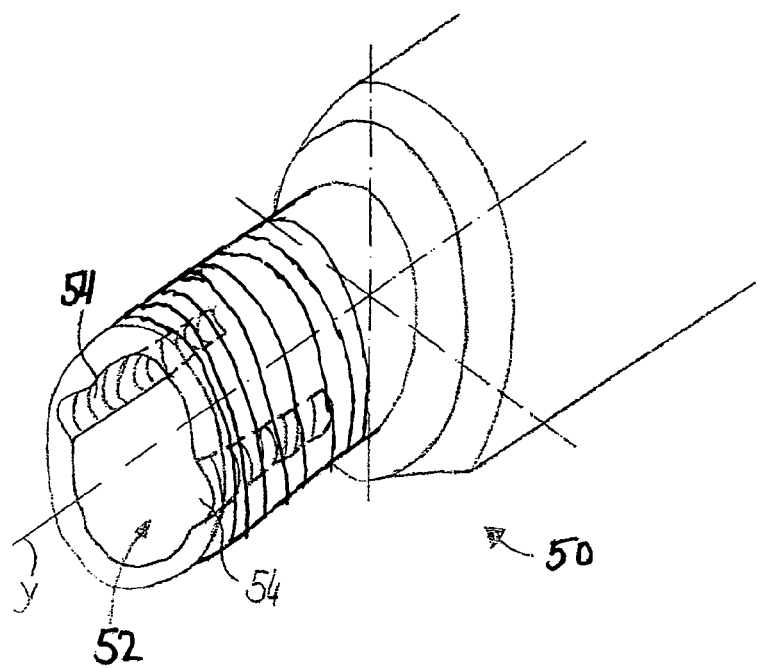
FIG. 3 is a perspective view of a screw element of a screw connection.

The fastening part 2 is designed to engage with a screw element 50 (see FIG. 3). The fastening part 2 in the depicted embodiment has two fastening segments 8, which are designed to engage with the inner wall of a recess 52 of the screw element 50. The fastening segments 8 here are arranged basically opposite each other in relation to an axis of symmetry X of the fastening device. The free end regions of the fastening segments 8 are fashioned in particular in their geometrical configuration so that the fastening segments 8 can engage in an essentially groovelike recess 54 of the screw element 50. For this, the free end regions of the fastening segments 8 are fashioned essentially congruent in shape with the groove 54 of the screw element 50.

The fastening segments 8 have locking projections 10 at the free end regions thereof, which preferably extend away from the free ends of the fastening segments 8. In particular, the free ends of the locking projections 10 are pointed essentially toward the securing part 4. The locking projections 10 fulfill the function of a protection against axial slippage of the fastening device out from the screw element 50 in the X direction, or along the X-axis. In the case of a forcible removal from the screw element 50, the locking projections 10 are preferably designed to break off, so that in this way there is a sign that the fastening device has already been used once.

Figure 4:
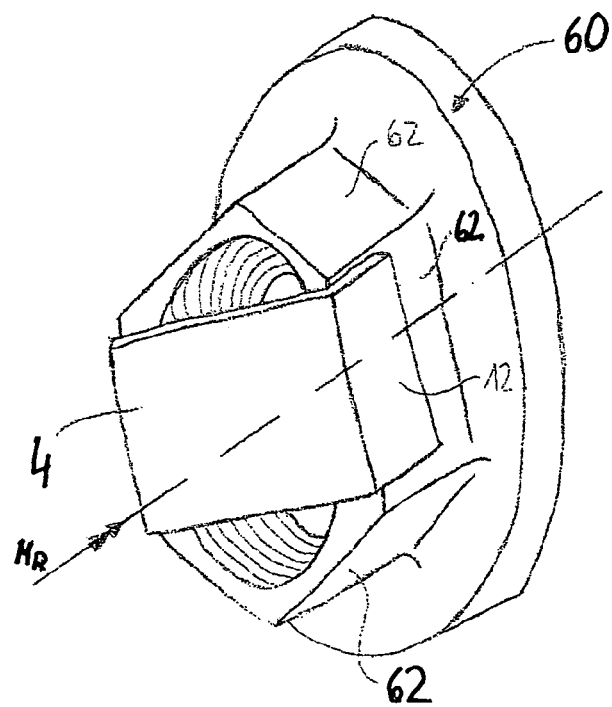
FIG. 4 is a perspective view of the fastening device on a nut of the screw connection.

The securing part 4 (FIG. 4) has two securing segments 12, which are designed to engage with an outer wall, especially the flanks 62 of a nut 60. The securing segments 12 here are arranged essentially opposite each other in relation to the axis of symmetry X of the fastening device. As illustrated, the securing part 4 is configured essentially as a U-shaped shackle, whose side walls forming the legs of the U-shape define the securing segments 12. Of course, the securing part 4 can likewise be fashioned as a cage or cap at least partly covering or enclosing the nut.

Figure 2:
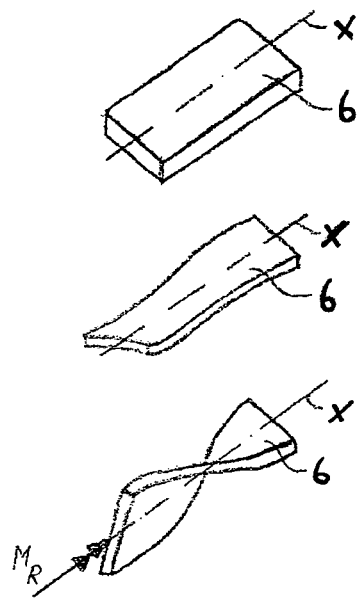
FIG. 2 includes three perspective views of an intermediate part of the fastening device.

The intermediate part 6 constitutes the connection between fastening part 2 and securing part 4. Consequently, the intermediate part 6 affords a non-positive connection between the fastening part 2 and the securing part 4. The intermediate part 6 is advantageously shaped as a twistable, sheetlike element (see FIG. 2), which acts as a torsion spring. The intermediate part 6 is thus made from a restorable or elastically deformable material (such as spring steel), so that when the securing part 4 is rotated or twisted relative to the fastening part 2 about the axis of symmetry X of the fastening device, a restoring moment $M_R$ directed toward the original state is produced.

Due to the fastening device of the invention, therefore, one can provide a screw connection between a screw element 50 and a nut 60, which ensures that the nut 60 does not become loosened from the screw element 50. The nut 60 will be screwed onto the screw element 50 to the desired degree. Then the fastening device of the invention will be introduced far enough into the recess 52 of the screw element 50 that the securing part 4 is not yet engaging with the nut 60. While introducing the fastening part 2 into the recess 52, the fastening segments 8 of the fastening part 2 are led into grooves 54 extending essentially in the axial direction or lengthwise direction Y of the screw element 50 (preferably the lengthwise direction Y of the screw element 50 is essentially parallel to the axis of symmetry X of the fastening device or identical to it). In this process, the locking projections 10 engage with a corresponding surface configuration of the grooves 54 so that a movement of the fastening device opposite the direction of insertion, i.e., a removal of the fastening device from the screw element 50, would result in a destruction of the locking projections 10. In this partly introduced state of the fastening device, the securing part 4 is now rotated through a predetermined angle in the loosening direction of the nut 60. This angle corresponds at least to a rotating far enough to align the securing segments 12 with the flanks 62 of the nut 60. In this state, the fastening device is now introduced far enough into the recess 52 of the screw element 50 that the securing segments 12 engage with the flanks 62 of the nut 60.

Due to the rotation of the securing part 4 relative to the fastening part 2, the intermediate part 6 is twisted and produces a torsional or restoring moment $M_R$, which acts in the direction of tightening the nut 60. Consequently, the nut 60 is subjected to a restoring moment $M_R$, SO that a secure fastening of the nut 60 on the screw element 50 can be assured.

In another embodiment, the fastening device is at least partly formed from a temperature-indicating material. In particular, the temperature indication can occur through an irreversible color change when heated. Thus, the temperature indicating material can be transparent in configuration and turn milky or opaque when a predetermined amount of heat is applied. In this way, it is possible during a maintenance procedure to ascertain the corresponding amount of heat applied to the nut 60 or the screw element 50, for example, from a roller bearing.

It is especially advantageous to use the fastening device to secure nuts in automotive engineering. Thus, the fastening device can be designed as an axle nut fastening device, in order to secure the nuts of an axle of a vehicle against becoming unscrewed during driving operation. The screw element 50 is therefore defined especially as the axle or the stub axle of a vehicle. In particular, the axle nuts of a truck can be secured in this way.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A fastening device for an axle nut, comprising:
a fastening part engaging an axially-extending groovelike recess of a screw element of a vehicle axle, wherein the fastening part includes at least one fastening segment that is adapted to engage with an inner wall of a screw element of a vehicle axle, wherein the at least one fastening segment comprises a pair of fastening elements arranged opposite each other;
a securing part engaging an axle nut that is threadably received on the screw element of the vehicle axle; and
an intermediate part coupling the fastening part and the securing part, wherein the intermediate part comprises a sheetlike configuration;
wherein the intermediate part comprises an elastically deformable material that applies a restoring torque to the securing part upon rotation of the securing part relative to the fastening part.

2. A fastening device for an axle nut, comprising:
a fastening part engaging an axially-extending groovelike recess of a screw element of a vehicle axle;
a securing part engaging an axle nut that is threadably received on the screw element of the vehicle axle; and
an intermediate part coupling the fastening part and the securing part, wherein the intermediate part comprises a sheetlike configuration;
wherein the intermediate part comprises an elastically deformable material that applies a restoring torque to the securing part upon rotation of the securing part relative to the fastening part, and wherein at least a select one of the fastening part, the securing part and the intermediate part comprise a temperature indicating material.

3. A screw connection for a vehicle axle, comprising:
a screw element of a vehicle axle, wherein the screw element includes a recess extending in a substantially axial direction, the recess includes an inner wall having at least one substantially axially extending groove;
an axle nut that is threadably received on the screw element of the vehicle axle; and
a fastening device comprising:
a fastening part engaging the screw element, wherein the fastening part includes at least one fastening segment that engages the at least one groove;
a securing part engaging the axially-extending groovelike recess of the screw element of a vehicle axle; and
an intermediate part coupling the fastening part to the securing part, wherein the intermediate part comprises an elastically deformable material that applies a restoring torque to the securing part upon rotation of the securing part relative to the fastening part, wherein the intermediate part comprises a sheetlike configuration.

4. The screw connection of claim 3, wherein the at least one fastening segment has at least one outwardly-extending locking projection.

5. The screw connection of claim 3, wherein the securing part comprises at least one securing segment engaging an outer wall of an axle nut.

6. The screw connection of claim 5, wherein the at least one securing segment includes a pair of securing segments arranged opposite to each other.

7. The screw connection of claim 6, wherein the securing segment is substantially U-shaped and engages opposite sides of an axle nut whose side walls forming the legs of the U-shape engage with the nut.

8. The screw connection of claim 5, wherein the at least one securing segment is adapted to engage at least one flank of an axle nut.

9. The screw connection of claim 3, wherein the fastening part, the securing part and the intermediate part comprise a single integral piece.

10. The screw connection of claim 3, wherein the intermediate part comprises a metal.

11. The screw connection of claim 3, wherein at least a select one of the fastening part and the securing part comprises a plastic.

12. The screw connection of claim 10, wherein the intermediate part comprises spring steel.

\* \* \* \* \*